United States Patent

[11] 3,547,446

[72] Inventor John T. Kern
Urbana, Ill.

[21] Appl. No. 644,857
[22] Filed June 9, 1967
[45] Patented Dec. 15, 1970
[73] Assignee V-M Corporation
Benton Harbor, Mich.
a corporation of Michigan

[54] PORTABLE TAPE RECORDER WITH A SINGLE FINGER-ACTUATED CONTROL KNOB
16 Claims, 19 Drawing Figs.

[52] U.S. Cl. .... 274/4; 179/100.2: 242/200
[51] Int. Cl. .... G11b 15/10.
[50] Field of Search .... 179/100.2Z: 274/4C, 11C; 242/55.13, 55.12C, 55.11C

[56] References Cited

UNITED STATES PATENTS

| | | | |
|---|---|---|---|
| 2,819,350 | 1/1958 | Steinegger | 179/100.2 |
| 3,009,024 | 11/1961 | Eash | 179/100.2 |
| 3,078,464 | 2/1963 | Lyon et al. | 242/55.13 |
| 3,250,481 | 5/1966 | Seki | 179/100.2 |
| 3,352,169 | 11/1967 | Delin et al. | 179/100.2 |
| 3,352,976 | 11/1967 | Gonmori | 179/100.2 |
| 3,373,951 | 3/1968 | Mazoyer | 242/55.13 |

*Primary Examiner*—Stanley M. Urynowicz, Jr.
*Assistant Examiner*—Robert S. Tupper
*Attorney*—Johnson, Dienner, Emrich, Verbeck & Wagner

ABSTRACT: A single finger-actuated knob controls the operation of a portable tape recorder provided with a removable cartridge which contains the tape carrying reels, the knob being actuatable in a generally T-shaped pattern and settable at different positions for play, record, fast-forward, rewind and stop. The cartridge contains a bowed spring which tensions the reels when the cartridge is out of the recorder and is relieved when the cartridge is operatively positioned in the recorder; the recorder having a spring biased brake element which engages the supply reel when the cartridge is positioned in the recorder and is relieved by movement of the control knob to its play and record positions. The tape is driven by engagement of the motor shaft with the takeup reel so that in the stopped condition of the tape recorder the motor shaft acts as a brake on the takeup reel. The cartridge also includes pressure pads supported on the free ends of the depending flexible members disposed in the open end of the cartridge which resiliently back the tape against the transducer head during record and playback of the tape.

Inventor:
John T. Kern
By Brown, Jackson, Boettcher & Dienner
Attys.

Inventor:
John T. Kern.
By Brown, Jackson, Boettcher & Dienner
Attys.

Inventor:
John T. Kern.
By Brown, Jackson, Boettcher & Dienner
Attys.

Inventor:-
John T. Kern
By Brown, Jackson,
Boettcher & Dienner
Attys.

Inventor:-
John T. Kern,
By Brown, Jackson, Boettcher & Dienner
Attys.

PORTABLE TAPE RECORDER WITH A SINGLE FINGER-ACTUATED CONTROL KNOB

This invention relates to magnetic tape recording devices and particularly to a recorder of the type utilizing tape supported within a removable cartridge that may be inserted within the recorder for proper registry of the tape with the transducer head and so as to permit recording of sound and/or playback of sound previously recorded thereon. In their preferred form, such devices are sufficiently compact in size and are of light weight as to be easily held in one hand of the operator and stored within the pocket of his coat or other wearing apparel.

A principal object of the invention is to provide a tape recorder in which the tape is wound between a pair of reels supported within a removable cartridge, the drive mechanism and operating controls for which are compactly arranged within the recorder itself and so as to achieve an efficient yet simplified and effective operation thereof.

Thus it is a feature of the invention that the cartridge has an open end which enters the recorder first and has means by which the tape is guided across said open end in a controlled pattern such that the tape is properly related to the recorder head for recording and playback of sound previously recorded on the tape.

Another feature of the invention is the provision of the cartridge with spring mounts adjacent said open end of the cartridge, the free ends of which are located relative to cooperating stops on the cartridge and recorder so as to provide resilient backing for the tape and which will hold it against the head with an appropriate amount of pressure when the cartridge is received within the recorder.

Still another feature of the invention is the provision of the cartridge with releaseable brake means which usefully tension the reels so as to prevent spillage of the tape when the cartridge is out of the recorder and which are relievable when the cartridge is inserted into the recorder so that the tension thereof does not become a drag on the tape, as when the tape is driven across the recorder head in the act of recording sound and/or playback.

In one form of the invention, the cartridge reel brake takes the form of a blade spring which is positioned between one wall of the cartridge and the reels and is bowed so as to resiliently bear against an adjacent portion of the reel flanges. Advantageously the spring is longitudinally slotted midway of its ends so as to constitute two separate sections, one for bearing against each reel. Also in accordance with the invention, each said sections is provided with an integral tab which projects through a provided opening in the cartridge wall so as to be engaged by provided abutments on the recorder to move the spring sections out of engagement with the reels when the cartridge is fully received within the recorder and so as to automatically relieve their braking function.

A further feature of the invention is that the recorder also includes a brake means located within the casing of the recorder itself and separate from the cartridge reel brake which engage and tension the reels when the cartridge is received within the recorder and the cartridge reel brake has been relieved, said further brake means being under the control of an actuator utilized to condition the recorder for recording and/or playback of sound.

In accordance with the invention, in the playback and record condition of the recorder, the tape is driven by engagement of the motor shaft with a peripheral portion of the takeup reel. Thus in the stopped condition of the motor engagement of its motor shaft with the takeup reel places tension upon that reel. Tension is also simultaneously placed on the supply reel by means of a brake element which is spring-biased to normally engage a peripheral portion thereof. Associated with said brake element is an actuator under the control of the operator used for energizing and deenergizing the motor. Thus the actuating thereof to energize the motor simultaneously relieves tension on both reels, as when the recorder is set for recording and/or playback of the sound.

Another feature of the invention is the provision of a switching element by which the transducer head may be selectively associated with appropriate circuitry and electronic components utilized for conditioning the recorder for recording and playback of sound, the same switching element also actuating the motor circuit so that the motor is energized only when the recorder is in recording and/or playback position. This not only reduces current wastage but also permits the aforedescribed use of the stopped motor shaft as a tensioner on the takeup reel in the "stop" condition of the recorder.

It is also highly desirable to be able on occasions to reverse the direction of tape movement in order to permit rewinding of the tape back onto the supply reel. In accordance with the present invention this is obtained by shifting or pivoting the motor so as to temporarily relocate its shaft in driving engagement with a peripheral portion of the supply reel. It is a feature of the present invention that said shifting of the motor so as to engage its shaft with the supply reel is also obtained by convenient manipulation of the operating knob which is utilized to actuate the aforedescribed movements of the switching element to selectively condition the recorder for recording and/or playback.

Also on occasions it is desirable to be able to drive the tape rapidly in a forward direction and at a greater speed than is required for recording and/or playback of sound on the tape. In accordance with the present invention, the recorder is therefore provided with means including a normally open switch which when closed connects into the motor circuit so as to step up the speed of the motor itself.

It is also desirable that the tape be rewound onto the supply reel at a fast rate and accordingly it is a further feature of the invention that the actuator for rocking the motor to shift its shaft from engagement with the takeup reel to engagement with the supply reel also closes said normally open switch.

It is also a feature of the invention that said actuator which rocks the motor and the normally open switch which is closed to speed up the motor are so located that when the control knob which actuates the switching element has been moved into a position where it is effective to locate the switching element so as to condition the recorder for playback the control knob may also be moved laterally in one direction to actuate the motor-shifting element to effect tape rewind and may also be moved laterally in the opposite direction to effect fast-forward movement of the tape.

It is a further feature of the invention that a lever arrangement is provided whereby in either of said laterally displaceable directions that the control knob is moved to effect said rewind or fast-forward movement of the tape, it also actuates means which closes the normally open switch to increase the speed of the motor.

A further feature of the invention is the provision of latch means which serve to inhibit such lateral movement of the control knob except when it is in said second operating position. This provides the further advantage that whenever the control knob is laterally moved, whether to effect rewind and/or to effect fast-forward movement, the motor is also energized. In addition there is no possibility of recorded material being accidentally erased from the tape as would be possible if the control knob could be laterally adjusted to "rewind" or "fast-forward" when the switching element is located in its first operating position which conditions the transducer head to erase old sound markings in preparation for new markings.

Thus a further feature of the invention is that all of the controls for operation of the tape are obtained by movement of a single control knob between a neutral position wherein the motor is deenergized and the two reels are tensioned against turning to a first operating position where the motor starts to move the tape and the transducer head is set for erase and recording sound on the erased tape. The control knob is also movable from its neutral position to a second operating position where it also energizes the motor but conditions the transducer head this time to playback sound previously recorded on the tape. In said second operating position, and only in said second operating position, the control knob is also adjustable laterally in one direction to effect rewind of the tape and is laterally displaceable in a second direction to move the tape forwardly, the speed of the tape in both said "rewind" and "fast-forward" settings of the control knob exceeding the normal tape speed for "record" and/or "playback."

A further feature of the invention is that all of the above-recited advantages and/or features thereof are obtained in a construction that is both simple and also compact and one which can be readily reproduced at a low unit cost.

Other and further objects, features and advantages of the present invention will be apparent or will become so from the following description of a preferred embodiment thereof which is given for the purpose of disclosure and in conjunction with the accompanying drawings in which like character references designate like parts throughout the several views.

Figures 7, 8, 9:
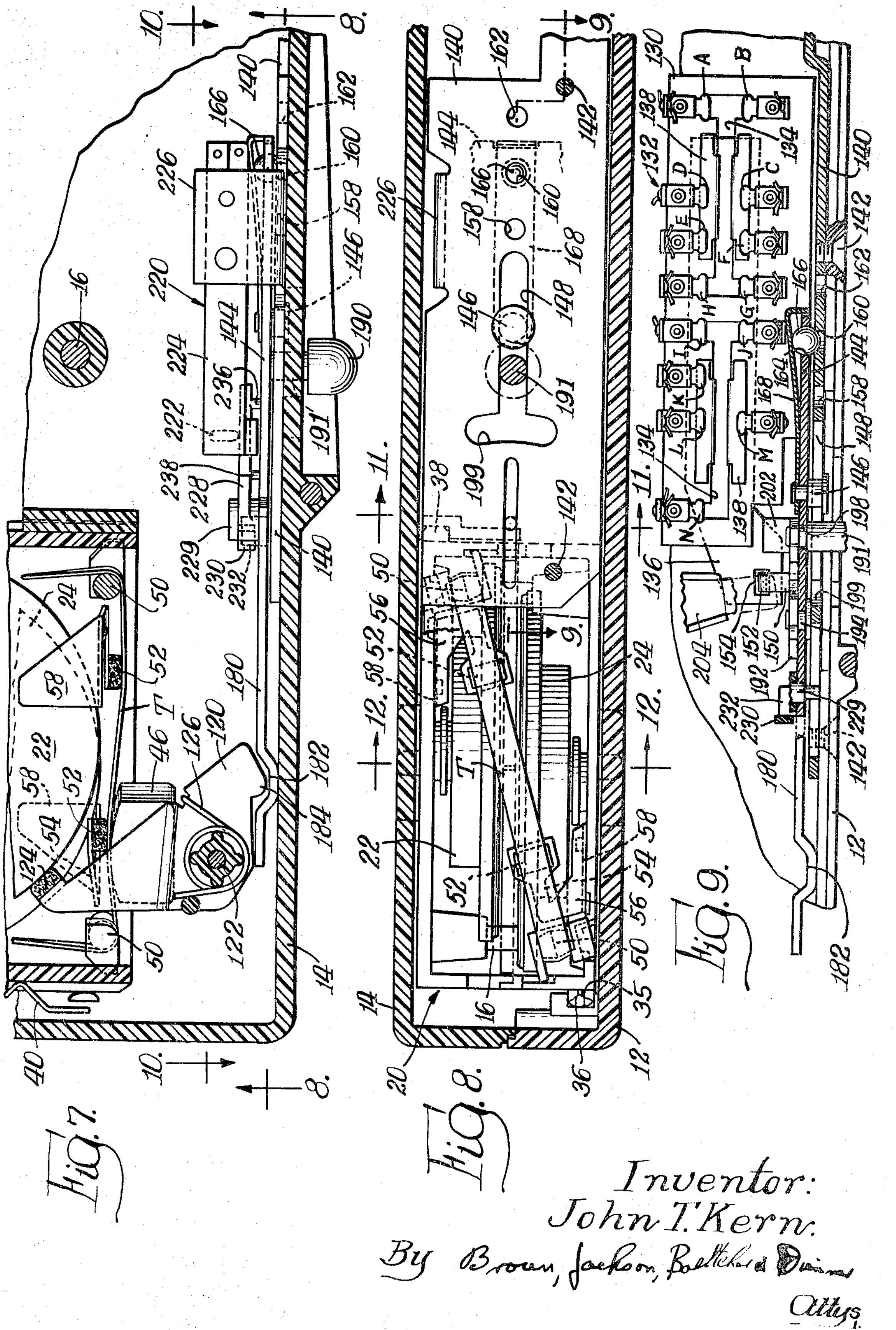
FIG. 7 is a fragmented sectional view taken along line 7–7 in FIG. 3 and illustrates the rockable spring-biased brake element of the recorder braking or tensioning the supply reel against turning, as when the recorder is in a "stop" condition.
FIG. 8 is a sectional view taken along line 8–8 of FIG. 7, and illustrates the rockable brake element and the position of the control slide when in the neutral or "stop" condition of the recorder.
FIG. 9 is a sectional view taken along lines 9–9 of FIG. 8 looking in the direction indicated by the arrows and show details in the operating controls for the switching element and the motor shift element as well as the brake release.
Figures 10, 11, 14:
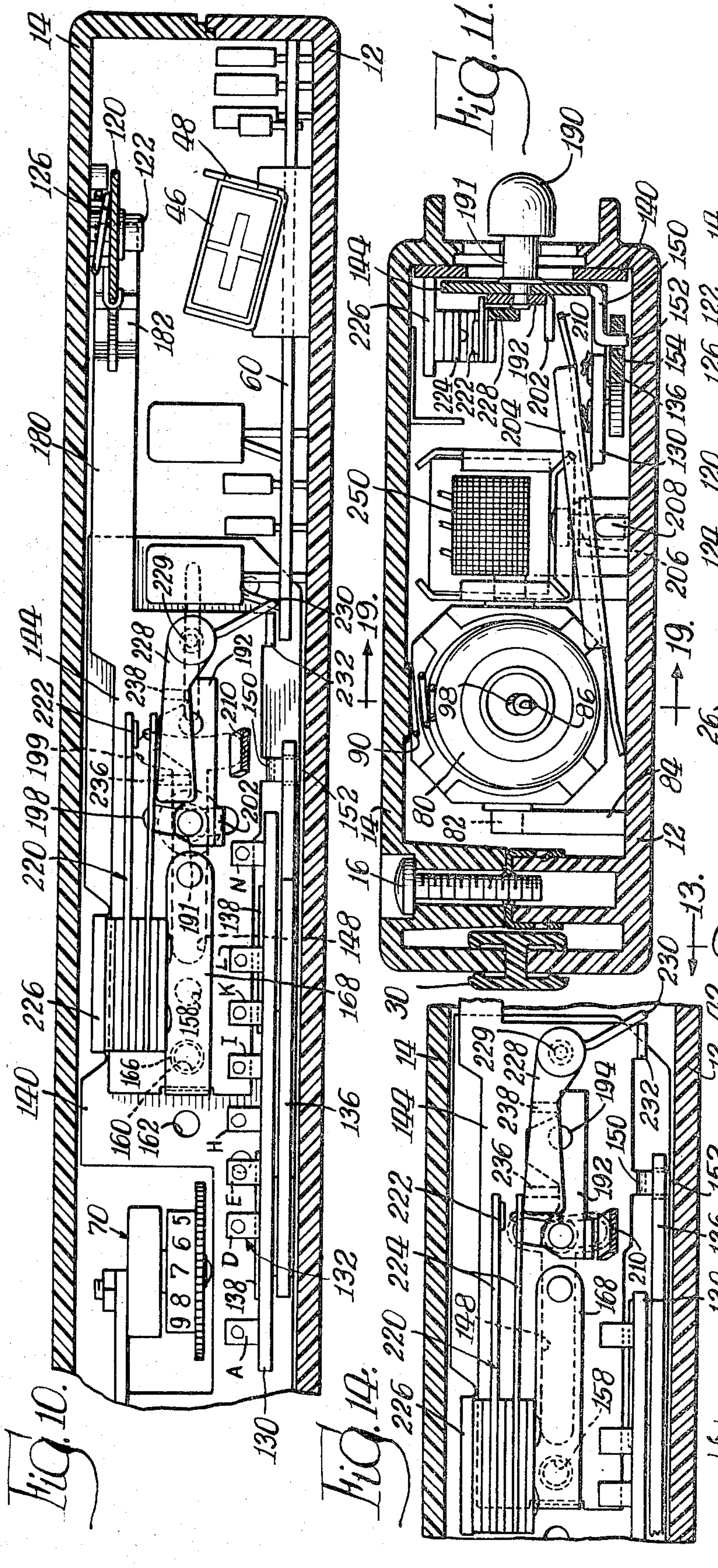
FIG. 10 is a sectional view taken along lines 10–10 of FIG. 7 looking in the direction indicated by the arrows and shows further details in the operating controls including the linkage which is used to operate the normally open switch of the motor speed up circuit.
FIG. 11 is a sectional view taken along lines 11–11 of FIG. 8 looking in the direction indicated by the arrows and illustrates details in construction of the mechanism used to shift or rock the motor about its pivotal mounting.
FIG. 14 is a view generally similar to FIG. 10, but fragmented, and shows the position of the motor switch when the control knob is in its second operating position which conditions the recorder for playback.
Figures 15, 16, 17, 18, 19:
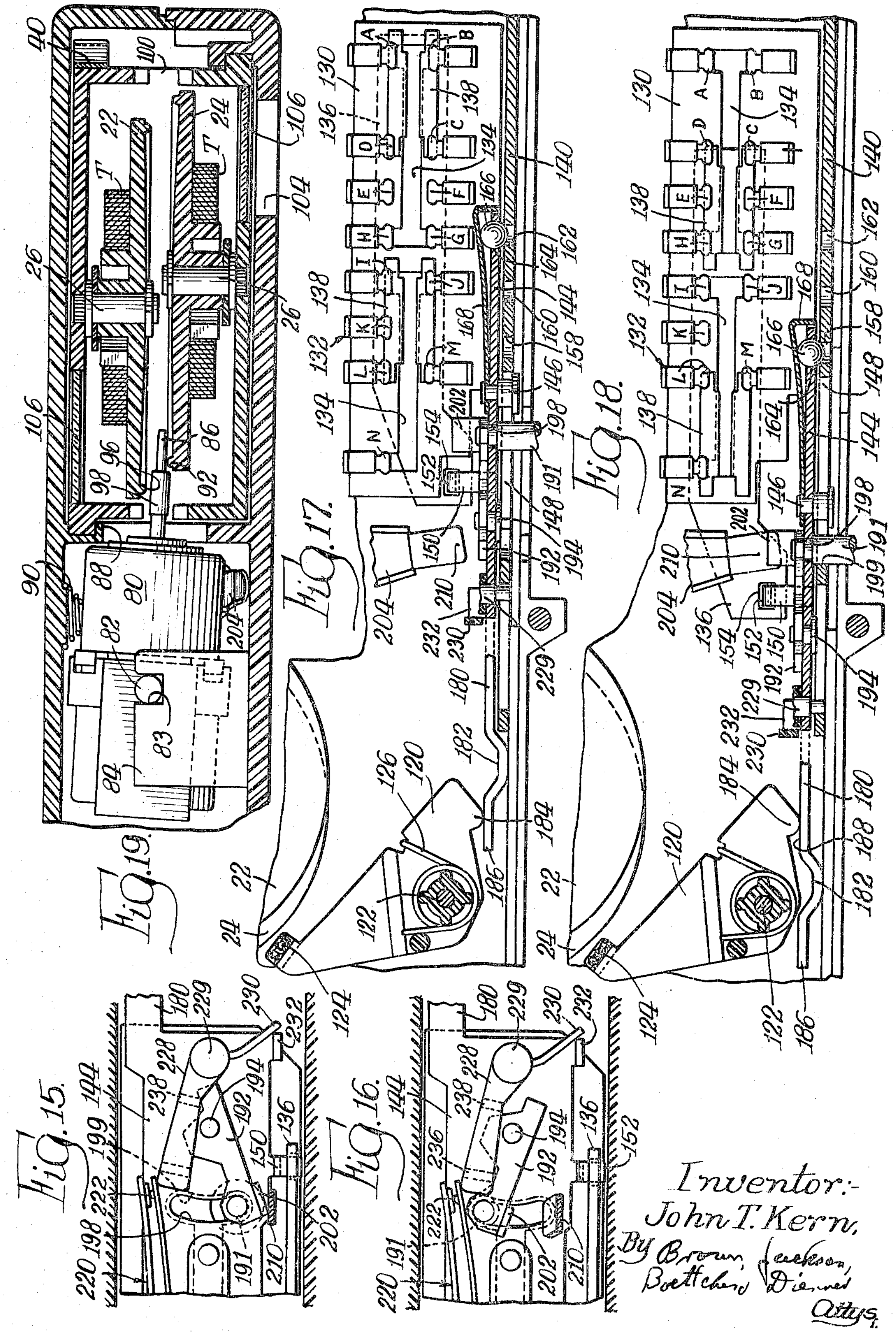
FIG. 15 is a view generally similar to FIG. 14 illustrating the position or setting of the control knob and associated levers to effect rewinding of the tape back onto the supply reel.
FIG. 16 is a view generally similar to FIGS. 14 and 15, but showing the position or setting of the control knob and the associated levers which it operates to condition the recorder for fast-forward movement of the tape.
FIG. 17 is a view generally similar to FIG. 9 but showing the control knob in its first operating position conditioning the recorder for recording sound on the tape as it moves across the transducer head.

FIG. 18 is a view generally similar to FIGS. 9 and 17 but showing the control knob and associated mechanisms in their second operating position which condition the recorder to playback sound previously recorded on the tape; and FIG. 19 is a sectional view taken along lines 19–19 of FIG. 11 and illustrates the normal position of the motor with its shaft in engagement with the flange of the takeup reel which it assumes when the recorder is set in its "stop" as well as its "record" and "playback" conditions.

Figures 1, 2, 3:
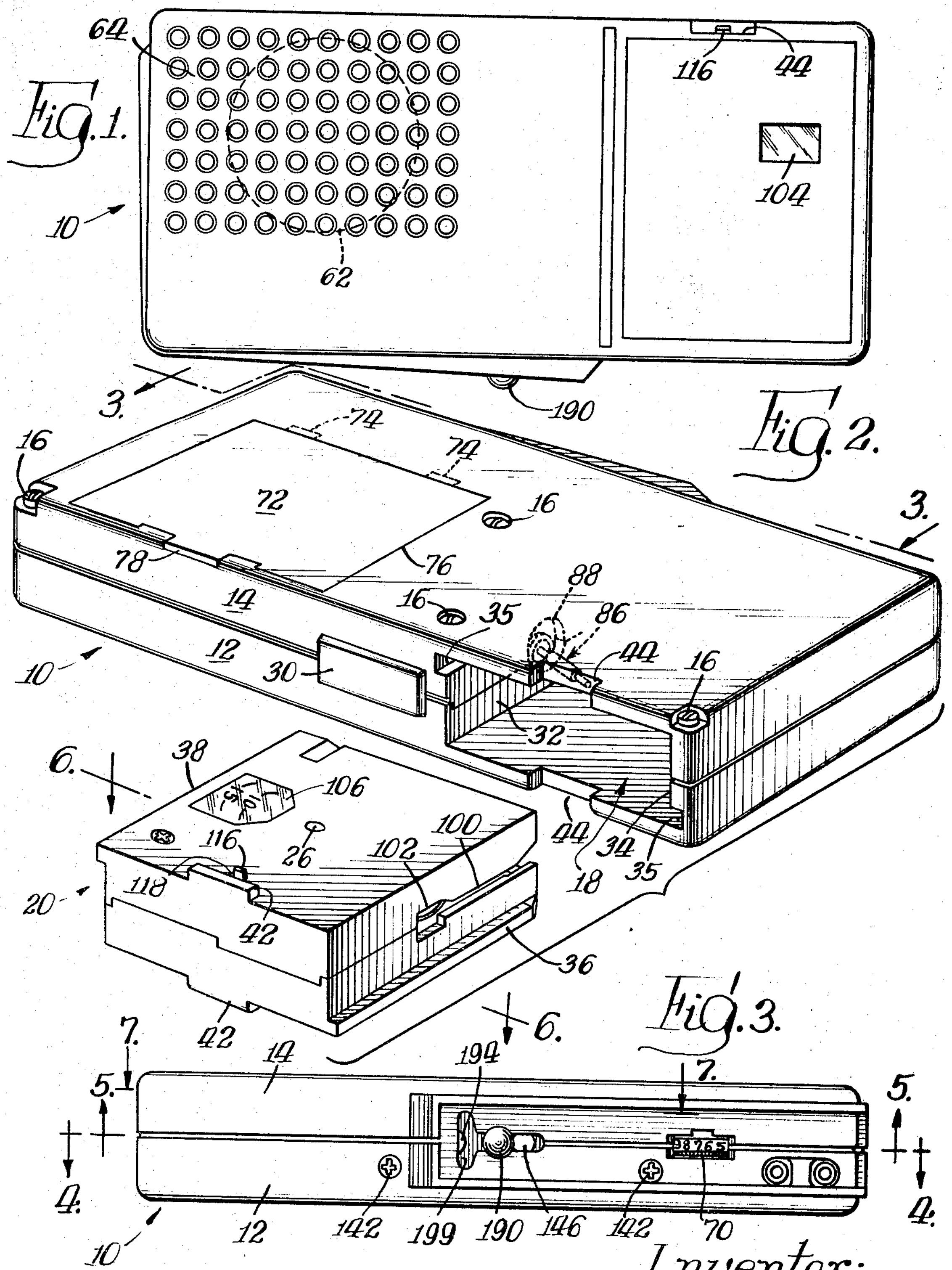
FIG. 1 is a plan view of a recorder constructed in accordance with the invention.
FIG. 2 is a perspective view thereof taken from the opposite side of the recorder and showing the tape cartridge removed therefrom but in alignment with its cartridge receiving cavity.
FIG. 3 is an elevational view of the recorder taken from the side of the recorder opposite that visible in FIG. 2 and along lines 3–3 of said FIG. looking in the direction indicated thereby.
Figures 4, 5, 6:
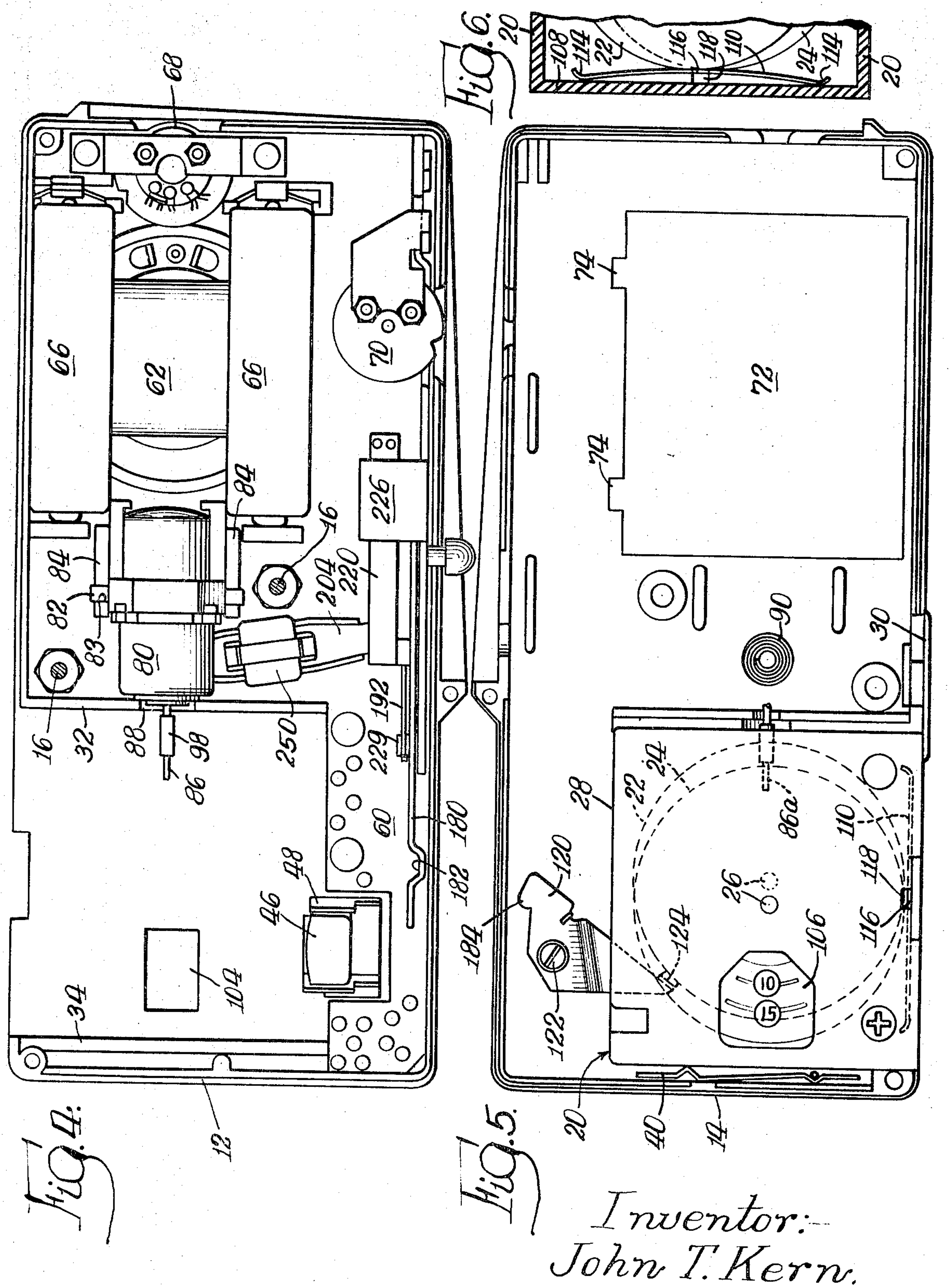
FIG. 4 is a view looking into one of the two sections into which the case of the recorder is separable and is illustrated as taken along lines 4–4 of FIG. 3 looking in the direction indicated by the arrows.
FIG. 5 is a view taken looking into the other section of the recorder case and shows the cartridge in position, the view being taken along lines 5–5 of FIG. 3 looking in the direction indicated by the arrows.
FIG. 6 is a sectional view taken through the cartridge showing the cartridge brake in position to tension the tape reels, the said view being considered as taken along lines 6–6 of FIG. 2.

Referring therefore more specifically to said several views and first to FIGS. 1, 2 and 3, a preferred embodiment of the invention is there illustrated as comprising a casing 10 having a recess 18 in one wall for removably receiving a tape cartridge 20. As illustrated, casing 10 is separable into two sections, one of which is identified at 12 and is illustrated in FIG. 4. The other is identified at 14 and is illustrated in FIG. 5. The two sections are normally united together as illustrated by said FIGS. 1 and 2 using suitable connection means such as screws 16. Although the position in which the recorder is disposed has little or no effect on its normal use, nevertheless for the sake of convenience in further describing the invention by means of the illustrated embodiments and while referring to the figures of the drawings, section 14 of the case will be considered as the top section and section 12 as the bottom section of the recorder. Also, the side containing the entrance to the cartridge receiving recess 18, shown in FIG. 2, will be considered the front wall of the recorder and the side pictured in FIG. 3 bearing control knob 190 will be considered the rear wall of the recorder.

Figures 12, 13:
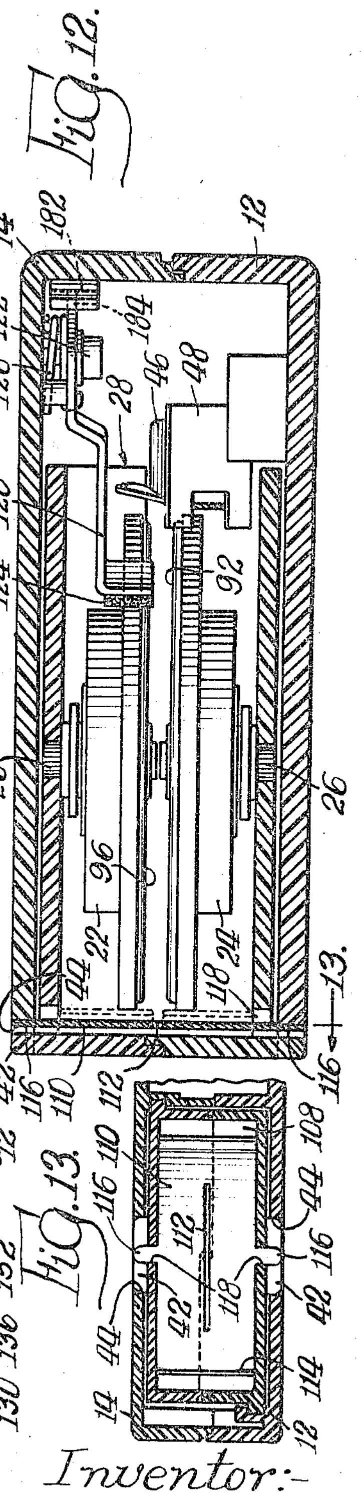
FIG. 12 is a sectional view taken along lines 12–12 of FIG. 8 looking in the direction indicated and shows details in the construction of the cartridge and also the relation of the cartridge brake and recorder brake to the cartridge reels when the cartridge is fully received within the cartridge receiving recess of the recorder.
FIG. 13 is a view taken along lines 13–13 of FIG. 12 to show further details in the construction of the cartridge brake.

Cartridge receiving recess 18, including its entrance, is of generally rectangular shape such that it snugly receives tape cartridge 20, constructional details of which are shown, described and claimed in the copending application of Robert J. Hammond, Ser. No. 597,607, filed Nov. 29, 1966 now U.S. Pat. No. 3,504,135 and owned by my assignee, to which reference may be had for a more complete description thereof, including the reels and manner of supporting the tape and driving the same when inserted within the casing. However, for the purposes of my invention it will suffice to understand that tape cartridge 20 includes both a supply reel 22 and a takeup reel 24, each of which is separately journaled to opposite walls of the cartridge by suitable connector means 26 which are in laterally offset relation as illustrated in FIGS. 5 and 19, although similarly spaced from the leading edge of the open end 28 of the cartridge, as shown in said FIG. 5 and also FIG. 12.

As shown in FIGS. 2 and 4, the two sides of recess 18 are defined by longitudinally extending walls 32 and 34 which function as guides along which corresponding walls of the cartridge move when it is inserted into the cartridge receiving recess 18. Said walls 32 and 34 also have longitudinally extending guideways 35 which are disposed in diagonally opposite corners of the recess and serve to receive portions 36 and 38 of the cartridge. The cartridge, when received within the recess 18 therefore fits snugly and resists up and down, as well as lateral displacement. A spring 40 (FIG. 5 and 7) may also be provided to assist in maintaining this snug relationship of the cartridge within the recorder. Cartridge 20 also includes a pair of oppositely disposed abutments 42 which engage within provided recesses or cutouts 44 on the top and bottom walls of the recorder casing when the cartridge is fully received within recess 18 and is held therein by any suitable means such as a closure member 30 shown slidingly keyed between adjacent edges of the two case sections 12 and 14. Abutments 42 in conjunction with closure 30 therefore function to accurately locate tape T (FIG. 7) in relation to the transducer head 46, shown in FIG. 4 as positioned at the inner end of the cartridge receiving recess 18 and positioned so as to be engaged by the tape moving across the open end of the cartridge under the guidance of its retention pins 50.

Referring now also to FIGS. 7 and 8, it will be seen that said tape retention pins 50 are located in diagonally opposite corners of the open end of the cartridge so that the tape T is directed off the upper one of the two reels considered hereinafter to be the supply reel 22 to the open end of the cartridge and then diagonally across said open end from right to left as illustrated in FIG. 8 and onto the lower or takeup reel 24. As illustrated in FIG. 4, transducer head 46 is supported on the bottom wall of casing section 12 by support 48 and to one side of the center of the recess 18. Transducer head 46 is also inclined and at a height such that it scans only the lower margin of the tape T traversing the open end of the cartridge. Tape retention pins 50 illustrated are essentially barrel shaped and each has a sharply defined centering ridge which serves to effectively hold the tape as it is moved diagonally across the open end of the cartridge whereby it is positively related to the transducer head 46 as above described. By the thus-described construction and arrangement of the head and tape the cartridge is usefully insertable either rightside up or upside down to allow both margins of the tape to separately scanned and wherefore two separate sound tracks may be marked on the tape in order to double the recording time for which each cartridge is useful.

To assure that the tape will also bear against the head at the proper pressure during its scanning by the head in either recording or playback, cartridge 20 is further provided with a pair of pressure pads 52 which may be of felt or other suitable material. As shown in FIGS. 7 and 8, pressure pads 52 are individually supported on the free end of the inclined arm 54 of a pair of flexible members or springs 56, each of which has its remote end 58 fastened to a respective one of the two opposite walls of the cartridge to which the reels are also journaled. It will be understood that pressure pad supporting members 56 may be of any appropriately resilient spring material and that their arms 54 are inclined to parallel the direction in which the tape is disposed across the ends of the cartridge by pins 50 and are also at a distance from abutments 42, which distance is related to the spacing of cutouts 44 from the head 46 so that a respective one of the pressure pads will back the tape and hold it in engagement with the transducer head 46 at a pressure useful to assure good reproduction and/or marking of sound on the moving tape. It will also be understood that pressure pads 52 and their mounts 56 are similarly spaced off center as is the transducer head 46 so that one of the pressure pads 52 will align with the head 46 in each of the two mentioned positions in which the cartridge 20 is insertable into recess 18.

Referring now to FIGS. 4 and 5, there is illustrated how the tape drive mechanism and the various components making up the amplifier circuit for the transducer head 46 including the power source, the tape drive motor and the operating controls therefore are advantageously mounted on the two sections of the casing and compactly arranged. Although for clarity in presentation the wiring by which the various electronic components and motor are connected to the transducer head to the controls has been omitted, it will be understood that the transistors and other electronic components of the amplifier circuit are usefully mounted on a plate 60 arranged in front of the cartridge receiving recess 18 and about the transistor head mount 48 in the lower case section 12 of the recorder. A combination microphone and speaker unit 62 is also conveniently fastened to the bottom wall casing section 12 over louvered section 64 thereof (FIG. 1) and flanked on either side thereof are a pair of batteries 66 which constitute the power source for the amplifier circuit and also the tape drive motor 80. Batteries 66 are advantageously of the smallest size which is sufficient to meet the power requirements of the recorder. For example, in one form of the invention two size AA batteries of 1.5 volts each have been found sufficient for this purpose. At 68 and 70 are the usual controls for regulating volume tone and the on and off switch. These are shown located so as to be operable through appropriately located openings in the casing wall. As shown in FIGS. 2 and 5, the upper casing section 14 also includes a removable cover 72 which frictionally fits within a provided recess 76 and has underlying tabs 74 along one end and a finger piece 78 along its other side by which the closure may be opened to provide access to the interior of the recorder casing, as for example to replace battery 66.

Any suitable means may be employed for transporting the tape across head 46 during the recording and/or playback function thereof. However in the illustrated embodiment, as shown best in FIG. 19 and also in FIG. 4, the tape drive comprises motor 80 pivotally mounted by a pair of trunnions 82 seating in provided recesses 83 of stanchions 84 on opposed sides thereof and so that its shaft 86 extends through a vertically elongated slot 88 in wall 32 and is capable of swinging through a plane including said mounts 26 about which the reels 22 and 24 are respectively journaled. Under the biasing of spring 90 secured to the upper wall of casing section 14 motor shaft 86 engages ribbed portion 92 on the peripheral flange of the takeup reel 24. Rotation of shaft 86 therefore transfers rotary motion to takeup reel 24 to effect winding of the tape off the supply reel across the transducer head 46 and onto the takeup reel, the diameter of motor shaft 86 being selected in accordance with the radial distance of rib 92 from the journal of the reel so that the motor 80 moves the tape across the head at the required speed for properly recording sound on the tape and/or playing it back. As shown in FIG. 19, supply reel 22 also has a circumferentially extending head 96 correspondingly spaced from the journal of said reel 22 wherefore by rocking motor 80 a larger diametered section 98 of the motor shaft may be urged into driving engagement with the supply reel 22 against the action of spring 90 so as to effect movement of the tape in the reverse direction and at a proportionately greater speed than is obtained by engagement of the smaller diametered motor section with the takeup reel. In order to facilitate location of the motor shaft between the flanges of the supply and takeup reels, the two sides of the cartridge are longitudinally slotted, as illustrated at 100 in FIG. 2, and terminate in an enlarged opening 102 which accommodates the above described rocking of the motor shaft 86. Also, as illustrated in FIG. 19, the bottom wall of the recorder case is preferably provided with a window 104 with which one of the two windows 106 of the cartridge 20 align in its two possible positions of insertion within recess 18 so that the amount of tape left on the supply reel is visually ascertainable.

One of the important features of the invention is the novel arrangement employed for exerting tension on the two reels both when the cartridge is contained within the recorder and when it is outside the recorder. Referring therefore now to FIGS. 5 and 6, considering them with FIGS. 12 and 13, a cartridge reel brake element 110 is shown located in the cartridge 20 which comprises a bowed spring positioned between the two reels and the wall of the cartridge opposite the open end thereof. As shown best in FIG. 13, spring 110 is also longitudinally slotted at 112 midway of its two ends and centrally of its top and bottom edges so that it is effectively divided into two sections each of which aligns with a respective one of the two reels. The outer ends 114 of the spring 110 are given a set and slotted central area sufficiently bowed that said outer ends of the spring engage wall 108 of the cartridge 20 and the central portion of the two sections above and below slot 112 respectively engage an adjacent peripheral edge portion of the takeup and supply reels 22 and 24. Separation of the blade spring 110 into two sections as described accommodate the different spacing of the reel flanges from said end wall of the cartridge which exists by reason of the noncoincidental journaling of the two reels. Brake 110 is therefore able to tension each of the reels individually and with sufficient force to resist free turning of the reels and possible spillage of the tape when the cartridge is out of the recorder case. Each said sections, however, also has an integral operating tab 116 (FIG. 13) which protrudes therefrom through a provided opening 118 in the top and bottom walls of the cartridge and which opening is enlarged such that in the act of inserting the cartridge into recess 18 the two tabs 116 engage the inner wall of cutouts 44 and wherefore the blade spring is displaced sufficiently far than when the cartridge is fully received within recess 18 the tensioning action of the spring sections on the two reels will have been relieved so that the reels are free to rotate with rotation of the motor shaft 86 as described above.

The invention also embodies means which act on the two reels so as to apply tension thereto when the cartridge is positioned within the recorder and the cartridge reel brake 110 has been relieved. This is important so that the tape will not move from a stopped position as before recording and/or playback of the tape is initiated or as when it is halted in the act of recording and/or playback of the tape. It will be appreciated that in the stopped condition of the motor 80 its shaft 86 continues to engage rib 92 of the takeup reel 24 so as to place a drag on the takeup reel 24 which resists rotation thereof. This is illustrated by phantom lines 86A in FIG. 5 and is also apparent from an inspection of FIG. 19. Tensioning supply reel 22 so as to resist its turning in the stopped condition of the motor is obtained by means of an internal brake element 120 shown in FIG. 5 as pivotally mounted by pivot member 122 to the top wall of the upper casing section 14. Internal brake element 120 as shown has a shoe 124 of felt or other suitable material which under the biasing of spring 126 (FIG. 7, 17 and 18) reacts on the brake element 120 so that its shoe 124 is normally urged into frictional engagement with the outer periphery of the supply reel flange 22. Accordingly, when the motor is in a deenergized condition and the cartridge is fully received within recess 18, cartridge brake 110 is caused to release its frictional engagement with the two reels; however, motor shaft 86 under the urging of spring 90 exerts tension on takeup reel 24 and simultaneously spring 126 also reacts on brake element 120 and its show 124 to place tension on the supply reel 22.

The invention also provides a novel arrangement by which a single control knob 190 (FIG. 3) may be operated to energize and deenergize motor 80 and simultaneously relieve the tension exerted by shoe 124 on the supply reel while simultaneously connecting the transducer head 46 into the amplifier circuit and selectively adapting it for recording sound or playback thereof on the tape. Referring to FIG. 9, a supporting member 130 of insulating material is shown fastened to the bottom wall of the lower case section 12 and supporting a plurality of contacts 132 on its upper side. Contacts 132 are illustrated as appropriately spaced from each other and on opposite sides of a pair of recesses 134 in said member 130. It will be understood that contacts 132 are connected by suitable wiring, not shown, such that when appropriate ones thereof are connected electrically the motor 80 is energized and the transducer head 46 is connected into the amplifier circuit so that the element 62 acts either as a speaker for emitting sound or as a microphone picking up sound which is transferred to the transducer head by the amplifying circuit. The exact details and operation of the amplifier circuit and said connection of the combination speaker/microphone 62 are of conventional construction and are not necessary to an understanding of the present invention. The same will therefore not be further described. However, in accordance with the present invention, there is provided a switching element 136 also of insulating material which is slidably mounted beneath 130 and is provided with portions 138 which lap opposed inner margins of said recesses 134 in member 130. Said portions 138 are of electrically conductive material and are adapted with movement of switching element 136 to establish electrical contact with selected contacts 132 of member 130 as will now be described.

Referring therefore first to FIGS. 8 and 9, a mounting plate 140 is shown bolted to the rear wall of the lower casing section 12 as by screws 142. At 144 is a slide slidably secured to mounting plate 140 by reason of a stud 146 which is slidably received within longitudinally extending slot 148 and retained therein by reason of its flattened head. Slide 144 includes an extension 150 having a depending end 152 which engages in aperture 154 in switching element 136. Switching element 136 therefore moves longitudinally of contact bearing member 130 with movement of slide 144. Mounting plate 140 is shown provided with three spaced openings 158, 160 and 162 and slide 144 is provided with a single opening 164 which is selectively alignable with one of said three spaced openings 158, 160 and 162. Opening 164 is shown as containing a ball detent 166 backed by resilient spring 168 also fastened to slide 144 by the inner end of mounting stud 146. Openings 158, 160 and 162 thus in cooperation with spring backed ball detent 166 provide three stable positions into which the switching element 130 may be set by control knob 190 which is fastened to slide 144 and protrudes outwardly through the wall of the recorder casing through a provided slot as hereinafter more specifically described. The neutral operating or stop position of the switching element 130 is illustrated by FIGS. 8 and 9 in which ball detent 166 seats in opening 160. In this neutral operating position of the switching element, contact making portions 138 are out of engagement with contacts 132A, 132B, 132G and 132H, as well as contacts 132I, J, and N. Accordingly, although the batteries 66 are connected into a portion of the amplifier circuit, motor 80 is deenergized and the transducer head 46 is not connected into the amplifying circuit with element 62 conditioned as either a microphone or as a speaker. The recorder is therefore in a stop condition and the tape does not move. Turning next to FIG. 17, slide 144 is shown as having been moved out of its said neutral position into a new position where ball detent 166 engages in opening 162 of mounting plate 140. This represents a first operating position of switching element 130. In this first operating position of the switching element it will be noted from FIG. 17 that contact making portions 138 have now established electrical contact between contacts 132A, 132B, 132C and 132D, wherefore transducer head 46 is now connected to element 62 conditioned as a microphone. Contacts 132I, 132J, 132K, 132L and 132M are also in electrical connection so that the motor 80 is energized. In this first operating position of the switching element 136 the tape is therefore moving past the transducer head under the engagement of the rotating motor shaft 86 with takeup reel 22 and head 46 is connected into the amplifier circuit such that it records sound on the moving tape which is transmitted thereto from element 62 acting as a microphone. Turning next to FIG. 18, switching element 136 is shown as having been moved by slide 144 to a second operating position wherein ball detent 166 engages in opening 158 in mounting plate 140. In this second operating position of switching element 136 contacts 132L and 132M are in engagement with contact 132N so that the motor remains energized and contacts 132C, 132D, 132E, 132F, 132G and 132H are also electrically connected, but contacts 132A and 132B are not now in the circuit. Accordingly the transducer head 4 is connected into the amplifier circuit but this time with element 62 functioning as a speaker. Consequently the tape is being moved by the motor across the transducer head 46 as when the switching element was in its first operating position. However, this time in scanning the tape the head is transmitting energy into the amplifier circuit which is amplified and translated thereby into audible sound which emanates from element 62 now conditioned as a speaker. Thus in this second operating position of the switching element the recorder is conditioned for playback of sound previously recorded on the tape T.

In the neutral position of the switching element 136, as described, the motor 80 is deenergized and the shoe 124, brake element 120 bears on the supply reel 22 (FIG. 7) to maintain the stopped condition of the tape. However, in the two operating positions of the switching element continued engagement of shoe 124 on the supply reel 22 introduces an unwanted drag on the tape. Means are therefore provided in accordance with the invention to eliminate said drag by rocking brake element 120 far enough against the biasing of spring 126 to move its shoe 124 out of engagement with reel 22. For this purpose, as illustrated in FIGS. 4 and 7, slide member 144 includes an extension 180 having a recess portion 182 which in the neutral position of slide 144 receives an abutment 184 provided on an angularly displaced arm of the brake element 120 and so as not to interfere with the described biasing action of spring 126. However, once slide 144 has been moved so as to locate switching element 136 in its first operating position as illustrated in FIG. 17, so as to energize motor 80 and condition head 46 to mark tape in response to sounds picked up by microphone 62, slide 142 will also carry extension 180 far enough to the right of FIG. 7 that its recess 182 is now beyond abutment 184 and wherefore the extreme end of the extension 186 engages the abutment 184 causing the brake element 120 to be rocked in a counterclockwise direction and against the action of spring 126 to the new position illustrated in said FIG. 17. In this position brake shoe 124 is out of engagement with the flange of the supply reel. Consequently there is no drag on the supply reel and the tape moves freely with response to rotation of the motor shaft 86 during the recording function which occurs with the switching element in this first operating position. In the second operating position of switching element 136, obtained by moving slide 144 to the position illustrated in FIG. 18, its extension 180 has been moved this time to the left far enough that abutment 184 now engages the extension to the other side of recess 182 which portion 188 effectively has rocked the internal brake 120 against the spring 126 so as to again free the dragging action of its shoe 124 on the supply reel. Therefore the supply reel is again free to rotate with energizing of motor 80 and with the transducer head 46 connnected into the amplifier circuit and the speaker element 62 for playback.

As earlier mentioned, finger knob 190 is fastened to slide 144 so that it is useful to effect said described longitudinal adjustment of slide 144 to locate switching element in one of its neutral and two operating positions. In accordance with the invention, control knob 190 is also useful to rock motor 80 about its pivotal connection at 82 so as to locate its motor shaft portion 98 against rib 96 of the supply reel as when it is desired to effect rewinding of the tape onto the supply reel 22. Referring therefore to FIGS. 14, 15 and 16 with FIG. 11, it will be seen that the control knob 190 is actually fastened to the free end of an intermediate member comprising an operating lever 192 shown pivotally connected to slide 144 as at 194. As shown in said FIGS. 14, 15 and 16, operating lever 192 is provided with a rearwardly extending lip at 202 which is disposed immediately below the connection of stem 191 of knob 190 thereto. Also, as shown in FIG. 11, motor 80 rests on the forward end of a first class lever 204 or shift element shown in FIG. 11 as confined by stud 206 so that it is capable of rocking on boss 208 as when the opposite end 210 of said lever 204 is depressed. From FIG. 14, it will be apparent that motor shift lever 204 is so disposed that its free end 210 lies below the path of horizontal movement of lip 202 and lip 202 of the operating lever 192 aligns therewith only when slide 144 has shifted switching element 136 to its second operating position as illustrated by FIG. 15. In the neutral and first operating positions of the switching element stem 191 of the control knob rides along horizontal slot 148 in the mounting plate 140 which inhibits any lateral displacement of knob 190. However, in the second operating position of the switching element 136 arcuate slot 198 in slide 144, through which stem 191 of the knob extends aligns with arcuate slot 199 in mounting plate 140. In this position, therefore, knob 190 may be depressed so as to rock lever 192 about its pivotal connection and so force its lip 202 against the free end of rock lever 204 so as to raise motor 80 and its shaft section 98 into engagement with rib 96 of the supply reel and against the force of spring 90. It will remain in this position only as long as the operator holds knob 190 in this depressed position. Obviously upon his release of knob 190, spring 90 will in turn be free to return the motor 80 to its normal position with shaft 86 engaging the takeup reel. By reason thereof spring 90 will also return knob 190 to its position as illustrated by FIG. 14. In this alternate position of the motor, which is obtained by depressing control knob 190, switching element 136 is not moved and so remains in its second operating position. Accordingly, motor 80 remains energized and so that its shaft section 96 serves to drive the supply reel in reverse and to rewind the tape.

It is also a feature of the invention that means are provided, also under the control of knob 190, which can be actuated to temporarily speed up the forward movement of the tape. Such is particularly useful, for example, on those occasions when it is desirable to pass over previously recorded material in an effort to locate particular recorded portions on the tape. Referring again to FIG. 14, this means is seen to comprise a normally open switch indicated generally at 220 which when its contacts 222 are closed connect a transformer 250 (FIG. 11) into the motor circuit so as to effectively increase the speed at which motor 80 is capable of rotating its shaft 86. In one form of the invention it has been found possible to effectively double the speed of the motor by this means. As shown in FIG. 14, contacts 222 are located on the free end of a pair of superposed spring arms 224 constructed of electrically conductive material, sandwiched between suitable insulating layers and cantilever supported on an outstanding flange portion 226 of mounting plate 140. As shown in FIG. 14, the contact bearing free ends of these two spring arms 224 are located immediately above the free end of the motor shifting lever 204 and also above the plane through which operating lever 192 moves with slide 144 although slightly forwardly thereof. Also, as shown in said FIG. 14, slide 144 pivotally supports a switch lever 228 shown pivotally connected thereto at 229. Switch lever 228 is essentially horizontally disposed and has its free end located immediately above and also forwardly of pivot lever 192. It also includes a pair of spaced abutments 236, 238 which lie on opposite sides of the pivotal connection 194 of lever 192 and so as to be capable of engagement by portions of the operating lever 192 when the same is rotated either clockwise or counterclockwise. Switch lever 228 also is provided with a depending spring leg 230 which is resiliently tensioned against an abutment 232 on the slide 144. The tensioning of leg 230 serves to maintain the horizontal portion of lever 228 essentially parallel to the longitudinal axis of slide 144 as illustrated and out of engagement with the contact bearing arms 224. Accordingly, when arcuate slot 198 in slide 144 is aligned with the arcuate slot 199 in mounting plate 140, knob 190 may be moved laterally in either direction. When it is moved into the upper reaches of the vertical arcuate slot 198 it carries operating lever 192 therewith into engagement with abutment 236 therefore urging switch lever 228 against the resisting action of leg 230 to engage contact bearing arms 224 and close contacts 222. Transformer 250 is thereby temporarily connected into the circuit of motor 80 causing it to rotate at an increased rate of speed. This it will continue to do until the operator releases knob 190. At that moment the resilient character of leg 230 will react to recenter the switch lever 228 so as to move it out of engagement with contact bearing arms 224 and so open switch 220. Thereupon motor 80 will slow down to its normal speed.

When knob 190 is depressed, as previously described, to rock the motor shaft into engagement with the supply reel to effect tape rewind, the right-hand end of the operating lever 192 will simultaneously be caused to engage abutment 238 wherefore again, as illustrated in FIG. 16, switch lever 228 will react against contact bearing arms 224 to close contacts 222. Accordingly depressing knob 190 not only shifts the rotating motor shaft from its driving engagement with takeup reel 24 to driving engagement with supply reel 22 to reverse the direction of tape movement but it also increases the tape speed, first by reason of the greater diameter of motor shaft section 98 which is engaging the supply reel, and secondly by connection of transformer 250 into the motor circuit. It will be understood that in each instance upon release of the control knob whether moved to the upper or lower reaches of the vertically extending arcuate slots 198 and 199 the resilient action of leg 230 acts as a detent to return the control knob 190 and center it in its playback or normal position.

It will thus be apparent that all of the recited objects, advantages and features of the invention have been demonstrated as obtainable in a highly practical yet compact and efficient structure. To wit, a tape recorder has been described in which the tape is conveniently located and removed from the tape recorder by reason of its inclusion in a cartridge 20. This cartridge has means by which the two reels are appropriately tensioned to guard against tape spillage when the cartridge is out of the recorder. At the same time all of the mechanisms for driving the tape and conditioning the transducer head for record and/or playback are provided in the recorder case itself and under the operation of a single operating knob. Furthermore, said knob is adapted to be moved in a tee pattern from "stop" position in which the motor is deenergized and the two reels are tensioned against movement into either a "record" position, a "playback" position, a "rewind" position or a "-fast-forward" position. Furthermore in each of these four operating positions, not only is the motor energized but the tape is driven in an appropriate direction and at the most advantageous speed, all of which is obtained automatically and without requiring any operation on the part of the user, other than to move the control knob to the elected position.

I claim:

1. In a tape recorder having a transducer head and a pair of rotatable reels between which tape is moved across the head, means including a motor having a shaft drivingly engaging one of said reels to move the tape from one reel across the head and onto the other reel when the motor is energized, a switching element mounted on the recorder for movement between a first position where it completes a circuit energizing the motor and a second position where it interrupts the circuit to deenergize the motor, the stopped shaft of the motor when deenergized serving to resist turning of the first mentioned one of said reels, and a spring-biased rockable brake element positioned to engage the other of the reels to resist turning thereof when the switching element is in its second position, and an actuating member operably associated with said switching element so as to selectively rock the brake element against said spring biasing thereof when the switching element is in its first position whereby to hold said brake element out of engagement with the other one of said reels when the switching element is moved to its first position where it energizes the motor.

2. The combination of claim 1 wherein the two reels are rotatably mounted within a cartridge removably positionable on the recorder, the cartridge containing independent brake means for tensioning the two reels against rotation, the recorder and cartridge having cooperating means which relieve the tensioning of the said independent reel brake means of the cartridge when the cartridge is properly positioned on the recorder.

3. The combination of claim 1 wherein the two reels are rotatably mounted within a cartridge removably positionable on the recorder, the cartridge containing a spring blade member frictionally engaging said reel to resist rotation thereof, the cartridge seating within a provided recess in the recorder so as to align the tape across the head and position one of the reels for engagement by the stopped shaft of the motor and the other one for engagement by the rockable brake element, and said spring blade member having a portion engaged by a portion of the recorder so as to hold the blade spring member out of frictional engagement with the reels when the cartridge is positioned properly in said recess.

4. In a tape recorder having a supply reel, a takeup reel, a transducer head and means including a motor for moving the tape from the supply reel across the head and onto the takeup reel, a switching element having a neutral position where it deenergizes the motor to stop the tape movement and is movable therefrom into first and second operating positions, means in said first operating position actuated by said switching element which adapts the head for recording sound on the tape moving thereacross and means in said second operating position actuated by said switching element which adapts the head for playing sound previously recorded on the moving tape, a brake element which is resiliently biased so as to engage at least one of said reels to resist turning thereof and an actuating member operably associated with said switching element to move therewith, said actuating member engaging said brake element so as to hold it out of engagement with said reel in each of the two operating positions to which the switching element is movable, said actuating member being out of engagement with said brake element in the neutral position of the switching element whereby the brake element tensions the reel against turning. 33

5. A tape recorder as claimed in claim 4 wherein the motor moves the tape by the engagement of its shaft with the takeup reel, the brake element acting on the supply reel and the motor shaft acting on the takeup reel in the stopped condition of the motor to brake the tape when the switching element is in its neutral position.

6. In a tape recorder, transducer head means, a pair of rotatably supported reels between which tape is moved across the head means, a motor adapted to engage one of said reels to drive the tape in one direction across the head means, a first switch having means when closed adapting the transducer head means to record sound on the tape moving thereacross, a second switch having means when closed adapting the transducer head means to play sound previously recorded on the tape, a rockable brake element spring-biased to engage the other reel, an actuator mounted to move between a neutral position and a pair of operating positions in which it acts on the brake element to release engagement thereof with the other reel and to energize the motor so as to initiate movement of the tape, the first switch being located to be closed upon movement of the actuator into its first operating position so as to place the recorder in recording condition and the second switch being located to be closed by movement of the actuator into its second operating position so as to place the recorder in playback condition, and means operable only when the actuator is in its second operating position to shift the motor so as to locate its shaft in engagement with the other of said reels so as to reverse the direction in which the tape is moved past the transducer head means.

7. In a tape recorder, transducer head means, a pair of rotatably supported reels between which tape is moved across the head means, a motor adapted when energized to move the tape from one reel across the head means to other reel, a first switch closeable to adapt the transducer head means to record sound on the tape moving thereacross, a second switch closeable to adapt the transducer head means to play sound previously recorded on the tape, a brake element adapted to frictionally engage at least one of said reels, an actuator mounted to move between a neutral position and a pair of operating positions in which it acts on the brake element to relieve its frictional engagement thereof with said reel and to energize the motor so as to initiate movement of the tape, the first switch being located to be closed upon movement of the actuator into its first operating position so as to place the recorder in recording condition and the second switch being located to be closed by movement of the actuator into its second operating position so as to place the recorder in playback condition, means associated with the motor by which it is adapted for reversing the direction in which it moves the tape, and the actuator when in one of said operating positions being also operable on said means to reverse the direction of tape travel.

8. The tape recorder claimed in claim 7 wherein the two reels are supported within a removable cartridge.

9. The tape recorder claimed in claim 7 wherein the actuator is adapted, when in its neutral and first operating positions, to inhibit operation of said means associated with the motor for reversing the direction in which the motor moves the tape.

10. In a tape recorder having a transducer head, a rotatably journaled supply reel, a rotatably journaled takeup reel, a shiftable motor having its shaft normally in engagement with the takeup reel so that when energized it moves the tape off the supply reel past the transducer head onto the takeup reel and when deenergized resists rotation of the reel, a pivotally mounted shifter element rockable so as to locate the motor shaft in engagement with the supply reel so as to reverse the direction in which the motor moves the tape when energized, a switching element having a neutral position where it deenergizes the motor to stop the tape movement, said switching element being movable into first and second operating positions where it energizes the motor, means actuated by movement of the switching element into said first operating position which adapts the recorder for recording sound on the tape moving across the head, means actuated by the movement of said switching element into said second operating position which adapts the recorder for playback of sound previously recorded on the tape moving across the head, said switching element having an operator associated therewith which is aligned with the shifter element when the switching element is in its second operating position, said operator being laterally displaceable when the switching element is in said second operating position so as to act on the shifter element to locate the motor shaft in engagement with the supply reel to effect rewinding of the tape.

11. The tape recorder claimed in claim 10 further including a brake element resiliently biased so as to engage at least one of said reels to resist turning thereof and an actuating member operably associated with said switching element to move therewith, said actuating member engaging said brake element so as to hold it out of engagement with said reel in each of the two operating positions to which the switching element is movable, said actuating member being out of engagement with the brake element in the neutral position of the switching element.

12. The tape recorder claimed in claim 10 further including actuatable means for speeding up rotation of the motor shaft, said actuatable means being operable by said laterally depressing the operator whereby the tape is rewound onto the supply reel at a speed greater than it moves forwardly during recording and playback.

13. The tape recorder claimed in claim 12 wherein the operator is also displaceable laterally in the opposite direction when the switching element is in its said second operating position, the actuatable means also being operated by moving the operator laterally in either of said directions whereby the tape may be also moved in a forward direction at a speed greater than that at which the tape moves during recording and playback.

14. The tape recorder claimed in claim 13 wherein the operator comprises a lever pivotally mounted on an actuator element which moves with the switching element and includes a portion which rides in a guiding track, said guiding track being shaped to inhibit lateral movement of the operator except when the switching element is in its second operating position.

15. The tape recorder claimed in claim 13 wherein the actuatable means includes a normally open switch disposed above the operator lever when the switching element is in its second operating position, the switching element supporting a lever pivotally mounted thereon which is adapted to be rocked by moving the operator lever in either of said lateral directions so as to close said normally open switch.

16. In a tape recorder having a head which scans tape moved thereacross, means including a motor for moving the tape in one direction across said head, a switching element mounted so as to be movable between a pair of operating positions in one of which positions it adapts the recorder for recording sound on the tape moving across the head and in the other of which positions it adapts the recorder for playing sound previously recorded on the tape, an actuator operable to temporarily reverse the direction in which the motor moves the tape across the head, means including a switch actuatable to increase the speed at which the motor drives the tape, and an operator operably connected to the switching element for moving it between said pair of positions, said switching element being adapted to permit the operator to be independently adjustable into a pair of alternate positions only when the switch element is located in the first-mentioned one of said positions, and means for actuating the actuatable switch, said means being operated by the operator when moved into either of its said alternate positions, the actuator being so positioned as to be actuated by movement of the operator into one of said alternate positions so as to effect rewinding of the tape.